United States Patent
Bohling et al.

(10) Patent No.: US 9,464,204 B2
(45) Date of Patent: Oct. 11, 2016

(54) STABLE AQUEOUS DISPERSION OF PARTICLE POLYMERS CONTAINING STRUCTURAL UNITS OF 2-(METHACRYLOYLOXY)ETHYL PHOSPHONIC ACID AND COMPOSITES THEREOF

(71) Applicant: Rohm and Haas Company, Philadelphia, PA (US)

(72) Inventors: James C. Bohling, Lansdale, PA (US); Arnold S. Brownell, Lansdale, PA (US); Muhunthan Sathiosatham, Chalfont, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 14/649,638

(22) PCT Filed: Nov. 26, 2013

(86) PCT No.: PCT/US2013/071789
§ 371 (c)(1),
(2) Date: Jun. 4, 2015

(87) PCT Pub. No.: WO2014/088873
PCT Pub. Date: Jun. 12, 2014

(65) Prior Publication Data
US 2015/0315406 A1  Nov. 5, 2015

Related U.S. Application Data

(60) Provisional application No. 61/733,450, filed on Dec. 5, 2012.

(51) Int. Cl.
C08K 3/22 (2006.01)
C09D 133/08 (2006.01)
C08F 220/18 (2006.01)
C08F 265/06 (2006.01)
C09D 143/02 (2006.01)
C09D 151/00 (2006.01)
C08F 220/14 (2006.01)
C08F 228/02 (2006.01)
C08F 230/02 (2006.01)

(52) U.S. Cl.
CPC .......... *C09D 133/08* (2013.01); *C08F 220/18* (2013.01); *C08F 265/06* (2013.01); *C08K 3/22* (2013.01); *C09D 143/02* (2013.01); *C09D 151/003* (2013.01); *C08F 220/14* (2013.01); *C08F 228/02* (2013.01); *C08F 230/02* (2013.01); *C08K 2003/2241* (2013.01)

(58) Field of Classification Search
CPC .. C08F 212/14; C08F 220/06; C08F 220/14; C08F 220/28; C08F 220/36; C08F 220/40; C08F 230/02; C08F 265/06; C08K 265/06; C09D 133/08; C09D 143/02; C09D 15/003
See application file for complete search history.

(56) References Cited

U.S. PATENT DOCUMENTS

| 5,385,960 | A | 1/1995 | Emmons et al. |
| 6,080,802 | A | 6/2000 | Emmons et al. |
| 6,710,161 | B2 | 3/2004 | Bardman et al. |
| 6,890,983 | B2 | 5/2005 | Rosano et al. |
| 7,081,488 | B2 | 7/2006 | Bardman et al. |
| 7,179,531 | B2 | 2/2007 | Brown et al. |
| 8,158,713 | B2 | 4/2012 | Finegan et al. |
| 2009/0326135 | A1 | 12/2009 | Nair et al. |

FOREIGN PATENT DOCUMENTS

| EP | 2426155 A1 | 3/2012 |
| WO | 2011157725 A2 | 12/2011 |

*Primary Examiner* — Alexa Neckel
*Assistant Examiner* — Marie Reddick
(74) *Attorney, Agent, or Firm* — Reid S. Willis

(57) ABSTRACT

The present invention is a composition comprising a stable aqueous dispersion of polymer particles comprising structural units of a nonionic monoethylenically unsaturated monomer; 2-(methacryloyloxy)ethyl phosphonic acid (MEP) or a salt thereof; and a sulfur acid monomer or carboxylic acid monomer or a combination thereof or a salt thereof, as well as a composite comprising the polymer particles adsorbed to the surface of a pigment particle such as $TiO_2$. The composition and composite are prepared using the phosphorus acid monomer MEP, which can be prepared in high purity with low residual non-polymerizable phosphorus acid, thereby reducing the load of neutralizing agent required to achieve the targeted pH as compared with phophoethyl methacrylate (PEM).

16 Claims, No Drawings

STABLE AQUEOUS DISPERSION OF PARTICLE POLYMERS CONTAINING STRUCTURAL UNITS OF 2-(METHACRYLOYLOXY)ETHYL PHOSPHONIC ACID AND COMPOSITES THEREOF

BACKGROUND OF THE INVENTION

The present invention relates to latex particles with structural units of 2-(methacryloyloxy)ethyl phosphonic acid and composites comprising the latex particles adsorbed onto pigment particles.

Stable aqueous dispersions of polymers containing structural units phophoethyl methacrylate (PEM) are known to improve hiding and stain resistance in paint formulations. The use of PEM-containing paint formulations is well known. For example, U.S. Pat. No. 8,158,713 B1 discloses surprising improvements in stain and scrub resistance for paint formulations containing binders comprising copolymers of ethyl acrylate and relatively low levels of PEM and acetoacetoxyethyl methacrylate. U.S. Pat. No. 5,385,960 discloses an improvement in hiding in paint formulations that include a dispersion of PEM-containing latex polymers adsorbed onto $TiO_2$. U.S. Pat. No. 7,081,488 B1 discloses an increase in hiding efficiency obtained with composite particles having adsorbed PEM-containing polymer particles when the polymer is prepared under conditions of low pH.

Unfortunately, PEM is not commercially available in high purity; although attempts to purify PEM have been described (see U.S. Pat. No. 6,710,161 B1), such processes are not considered to be commercially viable. Thus, PEM is supplied as an impure monomer that contains appreciable amounts of a dimethacryl diester of PEM as well as phosphoric acid, each of which contribute to problems associated with its use. Phosphoric acid, for example, contributes to the hydrolytic instability of the PEM; moreover, the presence of this mineral acid impurity necessitates a much larger charge of neutralizing agent to achieve the targeted pH. The presence of the diester, while not causing adverse effects in the synthesis of the latex, can act as a crosslinker, which can limit the utility of the monomer in applications requiring low molecular weights or solubilization of the emulsion or both. Accordingly, it would be useful to find a phosphorus-containing monomer that has the benefits of PEM and that can easily be prepared with high purity at relatively low cost.

SUMMARY OF THE INVENTION

The present invention addresses a need in the art by providing in one aspect a composition comprising a stable aqueous dispersion of polymer particles comprising, based on the weight of the polymer particles, from 50 to 99.8 weight percent structural units of a nonionic monoethylenically unsaturated monomer, from 0.1 to 10 weight percent structural units of 2-(methacryloyloxy)ethyl phosphonic acid or a salt thereof, and from 0.1 to 10 weight percent structural units of a sulfur acid monomer or a carboxylic acid monomer or a combination thereof or a salt thereof.

In a second aspect, the present invention is a composite comprising a stable aqueous dispersion of polymer particles adsorbed to the surface of a pigment particle, wherein the polymer particles comprise, based on the weight of the polymer particles, from 50 to 99.8 weight percent structural units of a monoethylenically unsaturated monomer, from 0.1 to 10 weight percent structural units of 2-(methacryloyloxy)ethyl phosphonic acid or a salt thereof, and from 0.1 to 10 weight percent structural units of a sulfur acid or carboxylic acid monomer or a combination thereof or a salt thereof.

The present invention addresses a need in the art by identifying a phosphorus acid monomer that, unlike PEM, can readily be produced in high yield and purity while maintaining or exceeding the properties achieved using PEM-containing latexes in coatings applications.

DETAILED DESCRIPTION OF THE INVENTION

In one aspect, the present invention is a composition comprising a stable aqueous dispersion of polymer particles comprising, based on the weight of the polymer particles, from 50 to 99.8 weight percent structural units of a nonionic monoethylenically unsaturated monomer, from 0.1 to 10 weight percent structural units of 2-(methacryloyloxy)ethyl phosphonic acid or a salt thereof, and from 0.1 to 10 weight percent structural units of a sulfur acid monomer or a carboxylic acid monomer or a combination thereof or a salt thereof.

Structural units of the monoethylenically unsaturated monomer can be structural units of one or more acrylic monomers, styrene monomers, vinyl ester monomers, ethylene, or structural units of certain combinations thereof including styrene-acrylic monomers, and ethylene-vinyl ester monomers. As used herein, the term structural unit of the named monomer refers to the remnant of the monomer after polymerization. For example, a structural unit of methyl methacrylate is as illustrated:

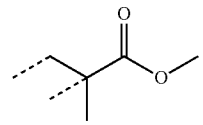

structural unit of methyl methacrylate

Preferably, the $T_g$ of the polymer particles is in the range of from −10° C., more preferably from −5° C., to 30° C., more preferably to 20° C. Preferably, the polymer particles comprise from 80, and more preferably from 90 weight percent, to 99.5, and more preferably to 99 weight percent, and most preferably to 98 weight percent structural units of a nonionic monoethylenically unsaturated monomer, based on the weight of the polymer particles. Suitable acrylic monomers include acrylates and methacrylates such as ethyl acrylate, butyl acrylate, 2-propylheptyl acrylate, 2-ethylhexyl acrylate, methyl methacrylate, ethyl methacrylate, acetoacetoxyethyl methacrylate, and ureido methacrylate. Preferred acrylic monomers include methyl methacrylate and at least one additional acrylate or methacrylate selected from the group consisting of ethyl acrylate, butyl acrylate, 2-propylheptyl acrylate, 2-ethylhexyl acrylate, and ureido methacrylate. Examples of suitable styrene monomers include styrene, vinyl toluene, and methyl styrene. Suitable vinyl esters include vinyl acetate and vinyl esters of neodecanoic acid.

Preferably, the polymer particles comprise from 0.2, more preferably from 0.5 weight percent, to 3 more preferably to 2 weight percent structural units of 2-(methacryloyloxy) ethyl phosphonic acid (MEP) or a salt thereof, based on the weight of the polymer particles. MEP can be prepared by contacting methacrylic acid with 2-hydroxyethyl phosphonic acid under conditions suitable for making the product in high yield and purity. Preferably, methacrylic acid is used in a stoichiometric excess with respect to the hydroxyethyl phosphonic acid; preferably, the mole:mole ratio of the methacrylic acid to the hydroxyethyl phosphonic acid is from 1.5:1 to 3:1.

Preferably, methacrylic acid and 2-hydroxyethyl phosphonic acid comprise at least 50 weight percent, more preferably at least 80 weight percent, more preferably at least 90 weight percent, and more preferably at least 95 weight percent of the reaction mixture. It is most preferred that the reaction is run neat, that is, in the absence or substantial absence of a solvent or cosolvent. The reaction is preferably carried out at a temperature of from 70° C., more preferably from 90° C., and most preferably from 120° C., to 170° C., more preferably to 150° C., and most preferably to 140° C. The reaction is preferably carried out at sub-atmospheric pressure, preferably from 300 and more preferably from 400 Torr, to 700 and more preferably to 600 Torr. The following scheme depicts a most preferred preparation of MEP:

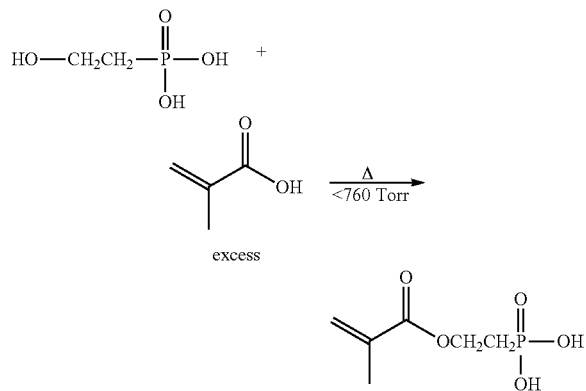

The reaction mixture also advantageously includes a small amount (~100 to 500 ppm) of an inhibitor such as phenothiazine (PTZ), 4-hydroxy-TEMPO (4-HT), methoxy hydroquinone (MeHQ) or hydroquinone (HQ). The resultant MEP made by this process is found to contain a substantial absence of phosphonic acid and diesters of MEP.

Preferably, the polymer particles comprise from 0.2, more preferably from 0.5 weight percent, to 5, more preferably to 3 weight percent structural units of a carboxylic acid or sulfur acid monomer, or a salt thereof, or a combination thereof, based on the weight of the polymer particles. Examples of suitable carboxylic acid monomers and salts thereof include methacrylic acid, acrylic acid, and itaconic acid and salts thereof; examples of suitable sulfur acid momomers include sulfoethyl methacrylate, sulfopropyl methacrylate, styrene sulfonic acids, vinyl sulfonic acid, and 2-(meth)acrylamido-2-methyl propanesulfonic acid, and salts thereof. A preferred sulfur acid monomer salt is a salt of a styrene sulfonic acid, sodium 4-vinylbenzenesulfonate.

The polymer particles may optionally include structural units of a multiethylenically unsaturated monomer such as allyl methacrylate, preferably at a concentration in range of from 0.1 to 10 weight percent, based on the weight of the polymer particles.

The polymer particles can be prepared in a single stage or a multistage emulsion polymerization process and, if desired, can be designed to have "acorn" morphology as disclosed in U.S. Pat. No. 7,179,531, wherein a relatively small core portion protuberating from a shell portion of the polymer particle is preferentially functionalized with $TiO_2$-adsorbing groups. In the composition of the present invention the $TiO_2$-adsorbing groups are MEP groups or salts thereof or a combination thereof. The core (also known as the pre-form) is contemplated by the composition of the present invention and will, by itself, preferably have a higher concentration of structural units of MEP, generally in the range 2 to 10 weight percent, based on the weight of the pre-form.

For polymer particles with acorn core-shell morphology, it is preferred that at least 80, more preferably at least 90 weight percent of structural units of MEP in the entire acorn particle are found on the protuberating core.

It has been discovered that latexes prepared using high purity MEP containing a substantial absence of residual non-polymerizable phosphorus acid, namely phosphonic acid, typically use 40 to 50% less neutralizing agent than what is required for the intrinsically impure, phosphoric acid-containing PEM. The consequences of using less neutralizing agent is especially apparent where a low odor coating formulation is desired: In such a case, ammonia would be eschewed in favor of a comparatively high molecular weight hard base such as NaOH or KOH, which contributes to a substantial reduction in the final solids content of the binder. For the highly pure MEP, higher weight percent solids polymer is more readily achievable.

The aqueous dispersion of polymer particles is useful for making a composite with pigment particles such as $TiO_2$. The composite can be prepared by contacting the stable aqueous dispersion of polymer particles with $TiO_2$, preferably with a $TiO_2$ slurry, as is well known in the art. Upon contact, at least a portion of the polymer particles, preferably at least a portion of the polymer particles with a protuberating core, are adsorbed to the surfaces of $TiO_2$ particles.

The composition and composite of the present invention are useful in coatings formulations such as paint formulations, which may include a variety of components such as solvents; fillers; rheology modifiers; hollow pigments, including pigments having one or more voids; dispersants, such as aminoalcohols and polycarboxylates; surfactants; defoamers; preservatives, such as biocides, mildewcides, fungicides, algaecides, and combinations thereof; flow agents; and leveling agents.

EXAMPLES

Comparative Example 1

Preparation of PEM-Containing Latex Particles

A first monomer emulsion was prepared by mixing deionized water (200 g), anionic surfactant (28.25 g, 30% active), butyl acrylate (285.6 g), methyl methacrylate (192.12 g), phosphoethyl methacrylate (25.5 g, 60% active), and sodium 4-vinylbenzenesulfonate (7.53 g, 90% active). A second monomer emulsion was prepared by mixing deionized water (420 g), Disponil FES 993 anionic surfactant (28.75 g, 30% active), butyl acrylate (666.4 g), methyl methacrylate (511.65 g), sodium 4-vinylbenzenesulfonate (3.78 g, 90% active), and ureido methacrylate (17 g, 50% active).

To 5-L, 4-necked round bottomed flask equipped with a paddle stirrer, a thermometer, a nitrogen inlet, and a reflux condenser was added deionized water (900 g) and Disponil FES 993 anionic surfactant (17 g, 30% active). The contents of the flask were heated to 84° C. under $N_2$ and stirring was initiated. A portion of the first monomer emulsion (110 g) was then added, quickly followed by a solution of ammonium persulfate (6.7 g) dissolved in deionized water (20 g), and a rinse of deionized water (5 g). After 10 min, the remainder of the first monomer emulsion, along with a rinse (25 g), and an initiator solution of ammonium persulfate (0.40 g) dissolved in deionized water (30 g) were added linearly and separately over 30 min. At the conclusion of the monomer emulsion addition, the contents of the flask were held at 84° C. for 10 min.

The second monomer emulsion and an initiator solution containing ammonium persulfate (1.1 g) dissolved in deionized water (80 g) were added linearly and separately to the flask over a period of 80 min After 20 min, a solution of ammonium hydroxide (16 g, 29% active) dissolved in deionized water (20 g) was added linearly and separately over the remaining 60 min of the monomer emulsion addition. The contents of the flask were maintained at a temperature of 83-84° C. during the addition of the second monomer emulsion. When all additions were complete, the container containing the second monomer emulsion was rinsed with deionized water (25 g), which was then added to the flask.

The contents of the flask were cooled to 65° C. and a catalyst/activator pair was added to the flask to reduce residual monomer. Tergitol 15-S-40 nonionic surfactant (24.25 g, 70% solids) was added and the polymer was then neutralized to pH 8.5 with a dilute aqueous KOH solution (100 g, 6.5% aqueous solution). The measured particle size was 95-105 nm and the solids were measured at 46-47%.

Example 1

Preparation of MEP-Containing Latex Particles

A first monomer emulsion was prepared by mixing deionized water (200 g), Disponil FES 993 anionic surfactant (28.25 g, 30% active), butyl acrylate (285.6 g), methyl methacrylate (202.32 g), 2-(methacryloyloxy)ethylphosphonic acid (16.11 g, 95% active), and sodium 4-vinylbenzenesulfonate (7.53 g, 90% active). A second monomer emulsion was prepared by mixing deionized water (420 g), Disponil FES 993 anionic surfactant (28.75 g, 30% active), butyl acrylate (666.4 g), methyl methacrylate (511.65 g), sodium 4-vinylbenzenesulfonate (3.78 g, 90% active), and ureido methacrylate (17 g, 50% active).

To 5-L, 4-necked round bottomed flask equipped with a paddle stirrer, a thermometer, a nitrogen inlet, and a reflux condenser was added deionized water (900 g) and Disponil FES 993 anionic surfactant (17 g, 30% active). The contents of the flask were heated to 84° C. under N$_2$ and stirring was initiated. A portion of the first monomer emulsion (110 g) was then added, quickly followed by a solution of ammonium persulfate (6.7 g) dissolved in deionized water (20 g), and a rinse of deionized water (5 g). After 10 min, the remainder of the first monomer emulsion, along with a rinse (25 g), and an initiator solution of ammonium persulfate (0.40 g) dissolved in deionized water (30 g) were added linearly and separately over 30 min. At the conclusion of the monomer emulsion addition, the contents of the flask were held at 84° C. for 10 min.

The second monomer emulsion and an initiator solution containing ammonium persulfate (1.1 g) dissolved in deionized water (80 g) were added linearly and separately to the flask over a period of 80 min After 20 min, a solution of ammonium hydroxide (8 g, 29% active) dissolved in deionized water (22 g) was added linearly and separately over the remaining 60 min of the monomer emulsion addition. The contents of the flask were maintained at a temperature of 83 to 84° C. during the addition of the second monomer emulsion. When all additions were complete, the container containing the second monomer emulsion was rinsed with deionized water (25 g), which was then added to the flask.

The contents of the flask were cooled to 65° C. and a catalyst/activator pair was added to the flask to reduce residual monomer. Tergitol 15-S-40 nonionic surfactant (24.25 g, 70% solids) was added and the polymer was then neutralized with KOH (50 g, 6.5% aqueous solution) and ammonium hydroxide (7 g, 29% active) to pH 8.8 with a dilute aqueous potassium hydroxide solution. The measured particle size was 95-105 nm and the solids content was found to be 46-47%.

Hiding and KU Stability for the Latexes of Example 1 and Comparative Example 1 are shown in Table 1:

TABLE 1

Hiding and KU Stability Data

|  | Comparative 1<br>1.5% PEM | Example 1<br>0.9% MEP |
|---|---|---|
| Hiding |  |  |
| S/mil | 5.92 | 6.09 |
| Tint Strength | 100.33% | 101.08% |
| Contrast Ratio | 97.32% | 97.29% |
| KU Stability |  |  |
| Initial KU | 99 | 96 |
| 1 d KU | 104 | 104 |
| 7 d KU | 106 | 105 |
| 28 d KU | 105 | 103 |

As the results show, the MEP-containing latex shows hiding and KU stability comparable to the PEM-containing latex, while using substantially less bases to neutralize the latex to the targeted pH.

Comparative Example 2

Preparation of PEM-Containing Latex Particles with Acorn Morphology

A. Preparation of the Pre-Form

A first monomer emulsion was prepared by mixing DI water (200 g), Disponil FES 993 anionic surfactant (21.3 g, 30% active), butyl acrylate (371.2 g), methyl methacrylate (195.2 g), allyl methacrylate (9.6 g), phosphoethyl methacrylate (51.2 g, 60% active), and methacrylic acid (12.8 g).

To a 5-liter, four-necked round-bottom flask equipped with a paddle stirrer, a thermometer, N$_2$ inlet, and a reflux condenser was added DI water (600 g) and Disponil FES 32 anionic surfactant (64.0 g, 30% active). The contents of the flask were heated to 85° C. under a N$_2$ atmosphere, and stirring was initiated. A portion of the first monomer emulsion (70 g) was then added, quickly followed by addition of an aqueous solution of sodium persulfate (2.56 g in 30 g DI water) and a further rinse with deionized water (5 g). After stirring for 10 min, the remainder of the first monomer emulsion, followed by a DI rinse (25 g), and an aqueous initiator solution of sodium persulfate (0.64 g dissolved in 50 g DI water) were added linearly and separately over 40 min After completion of addition of the monomer emulsion feed, the contents of the flask were held at 85° C. for 10 min After 10 min the co-feed was finished, and the contents of the flask were held at 85° C. for an additional 10 min.

The contents of the flask were cooled to 65° C. and an activator was added to reduce residual monomer. The polymer was then neutralized to pH 2.6 with aqueous ammonium hydroxide (12.5 g, 29% active) further diluted with water (12.5 g). The measured particle size was 60 nm to 75 nm by BI90 light scattering and the solids content was found to be 40-41%.

B. Preparation of the Acorn

To a 5-liter, four-necked round bottomed flask equipped with a paddle stirrer, a thermometer, nitrogen inlet, and a reflux condenser was added deionized water (950 g). The contents of the flask were heated to 85° C. under nitrogen and stirring was initiated. Pre-form (~400 g) was added to the kettle, followed by a solution of sodium persulfate (4.8 g) dissolved in deionized water (20 g), and a rinse of deionized water (5 g). Once the kettle temperature had returned to 85° C., the second stage feeds were started.

A monomer emulsion was prepared by mixing deionized water (360 g), sodium dodecylbenzene sulfonate (66 g, 23% active), butyl acrylate (720 g), styrene (686.9 g), acrylic acid (28.8 g), and sodium 4-vinylbenzenesulfonate (4.8 g, 90% active). The monomer emulsion and an oxidant solution containing sodium persulfate (2.4 g) and NaOH (2 g, 50% active) dissolved in deionized water (56 g) were added linearly and separately to the flask over 120 min. The contents of the flask were maintained at 85° C. during the addition of the monomer emulsion. When all additions were complete, the container containing the monomer emulsion was rinsed with deionized water (25 g), which was then added to the flask.

The contents of the flask were cooled to 65° C. and a catalyst/activator pair was added to the flask to reduce residual monomer. The polymer was then neutralized to pH 8 with aqueous sodium hydroxide and ammonium hydroxide. The measured particle size by BI90 light scattering was 134 nm and the solids content was 45%.

Example 2

Preparation of MEP-Containing Latex Particles with Acorn Morphology

A. Preparation of the Pre-Form

A first monomer emulsion was prepared by mixing DI water (200 g), Disponil FES 993 anionic surfactant (21.3 g, 30% active), butyl acrylate (371.2 g), methyl methacrylate (213.15 g), allyl methacrylate (9.6 g), 2-(methacryloyloxy) ethylphosphonic acid (35.0 g, 95% active), and methacrylic acid (12.8 g).

To a 5-liter, four-necked round-bottom flask equipped with a paddle stirrer, a thermometer, $N_2$ inlet, and a reflux condenser was added DI water (600 g) and Disponil FES 32 anionic surfactant (64 g, 30% active). The contents of the flask were heated to 85° C. under a $N_2$ atmosphere, and stirring was initiated. A portion of the first monomer emulsion (70 g) was then added, quickly followed by addition of an aqueous solution of sodium persulfate (2.56 g in 30 g DI water) and a further rinse with deionized water (5 g). After stirring for 10 min, the remainder of the first monomer emulsion, followed by a DI rinse (25 g), and an aqueous initiator solution of sodium persulfate (0.64 g dissolved in 50 g DI water) were added linearly and separately over 40 min After completion of addition of the monomer emulsion feed, the contents of the flask were held at 85° C. for 10 min After 10 min the co-feed addition was finished, and the contents of the flask were held at 85° C. for an additional 10 min. The contents of the flask were cooled to 65° C. and an activator was added to the flask to reduce residual monomer. The polymer was then neutralized to pH 2.6 with aqueous ammonium hydroxide (6.5 g, 29% active) further diluted with water (6.5 g). The measured particle size was 50-65 nm and the solids content was found to be 40-41%.

B. The acorn was prepared in accordance with step B of Comparative Example 2 B.

As Example 1 and Comparative Example 1 demonstrate, the amount of KOH used to neutralize the PEM-containing multi-stage non-acorn polymer was 35% higher (100 g versus 70 g) than what was required to neutralize the corresponding MEP-containing polymer, and the amount of ammonium hydroxide used in the former was double the amount used in the latter (16 g versus 8 g). For the acorn pre-form (Example 2A and Comparative Example 2A) nearly twice as much ammonium hydroxide was required to neutralize the PEM-containing pre-form polymer (12.5 g versus 6.5 g).

Table 2 shows the stability of particle size (PS) over 14 days for the acorn cores of Example 2 and Comparative Example 2.

TABLE 2

Particle Size Stability Study

| | | Latex Heat Age Stability (50° C.) | | | | |
|---|---|---|---|---|---|---|
| Example # | Monomer | 0 day PS | 3 day PS | 6 day PS | 10 day PS | 14 day PS |
| 2 | 5.2% MEP (95%) active | 56 nm | 56 nm | 60 nm | 64 nm | 66 nm |
| Comp. 2 | 8.0% PEM (60% active) | 70 nm | 86 nm | 113 nm | 132 nm | 153 nm |

As the Table 2 data show, particle size stability is superior for the acorn core prepared using MEP.

The general paint formulation for the tested samples is shown in Table 3.

TABLE 3

Paint Formulations

| Material Type | Pounds | Gallons | Level | Dry Weight |
|---|---|---|---|---|
| Acrylic Binder | 553.40 | 62.74 | | 259.43 |
| Defoamer | 0.50 | 0.06 | | 0.49 |
| Water | 50.00 | 5.99 | | 0.00 |
| TiO$_2$ slurry @ 76.5% | 261.35 | 13.40 | 17.17% PVC | 199.93 |
| Premix Sub-total | 865.25 | 82.20 | | |
| Water | 15.00 | 1.80 | | 0.00 |
| Grind | | | | 0.00 |
| Water | 16.70 | 2.00 | | 0.00 |
| Organic Amine Neutralizer | 1.00 | 0.13 | | 0.00 |
| Defoamer | 1.00 | 0.12 | | 1.00 |
| Hydrophilic Copolymer Dispersant | 3.00 | 0.30 | 0.64% Disp | 1.50 |
| Crystalline Silica Extender | 36.00 | 1.63 | 4.62% PVC | 36.00 |
| Grind Sub-total | 57.70 | 4.18 | 4.62% PVC | |
| LetDown | | | | |
| Defoamer | 1.00 | 0.14 | | 1.00 |
| Organic Amine Neutralizer | 3.00 | 0.39 | | 0.00 |
| Nonionic Surfactant | 3.75 | 0.15 | | 3.00 |
| Water | 15.00 | 1.80 | | 0.00 |
| Premix | | | | 0.00 |
| HASE Thickener | 15.00 | 1.70 | | 4.50 |
| Water | 15.00 | 1.80 | | 0.00 |
| Premix Sub-total | 30.00 | 3.50 | | |
| Premix | | | | 0.00 |
| HASE Thickener | 1.00 | 0.11 | | 0.30 |
| Water | 1.00 | 0.12 | | 0.00 |

TABLE 3-continued

Paint Formulations

| | | | |
|---|---|---|---|
| Premix Sub-total | 2.00 | 0.23 | |
| Defoamer | 2.00 | 0.28 | 2.00 |
| Water | 42.31 | 5.07 | 0.00 |
| Totals | 1037.01 | 100.00 | 509.16 |

| Property | Value | |
|---|---|---|
| Total PVC | 21.80 | % |
| Volume Solids | 35.20 | % |
| Weight Solids | 47.77 | % |
| Density | 10.3701 | lb/gal |
| Dry Density | 13.4624 | lb/gal |
| Total Dispersant | 0.64 | % |
| Total Coalescent | 0.00 | % |

The invention claimed is:

1. A composition comprising a stable aqueous dispersion of polymer particles comprising, based on the weight of the polymer particles,
   a) from 50 to 99.8 weight percent of structural units of a nonionic monoethylenically unsaturated monomer;
   b) from 0.1 to 10 weight percent of structural units of 2-(methacryloyloxy)ethyl phosphonic acid or a salt thereof, and
   c) from 0.1 to 10 weight percent of structural units of a sulfur acid monomer or a salt thereof or a carboxylic acid monomer or a salt thereof or a combination of a sulfur acid monomer and a carboxylic acid monomer or salts thereof.

2. The composition of claim 1 wherein the nonionic monoethylenically unsaturated monomer is an acrylic monomer, a styrene monomer, a combination of styrene and acrylic monomers, a vinyl ester monomer, or a combination of ethylene and vinyl ester monomers, and the $T_g$ of the polymer particles is in the range of from −10° C. to 30° C.

3. The composition of claim 1 wherein the polymer particles comprise from 80 to 99 weight percent of structural units of the nonionic monoethylenically unsaturated monomer, based on the weight of the polymer particles, wherein the nonionic monoethylenically unsaturated monomer is an acrylic monomer or a combination of acrylic and styrene monomers.

4. The composition of claim 3 wherein the acrylic monomer is one or more monomers selected from the group consisting of methyl methacrylate, ethyl acrylate, butyl acrylate, 2-propylheptyl acrylate, 2-ethylhexyl acrylate, and ureido methacrylate; and the styrene monomer is styrene.

5. The composition of claim 1 wherein the polymer particles comprise from 2 to 10 weight percent of structural units of 2-(methacryloyloxy)ethyl phosphonic acid or a salt thereof, based on the weight of the polymer particles.

6. The composition of claim 1 which comprises from 0.5 to 5 weight percent of structural units of a salt of a sulfur acid monomer based on the weight of the polymer particles, wherein the salt of the sulfur acid monomer is sodium 4-vinylbenzenesulfonate.

7. The composition of claim 1 wherein the polymer particles have an acorn morphology wherein cores protuberates from shells of the polymer particles, and wherein the cores comprise at least 90 weight percent of the structural units of 2-(methacryloyloxy)ethyl phosphonic acid or salt thereof, based on the weight of the polymer particles.

8. A composite comprising the stable aqueous dispersion of polymer particles of claim 1 adsorbed to the surface of a pigment particle.

9. A paint formulation comprising the composite of claim 8 and one or more components selected from the group consisting of solvents, fillers, rheology modifiers, hollow pigments, dispersants, surfactants; defoamers, preservatives, flow agents, and leveling agents.

10. The composition of claim 1 wherein the polymer particles comprise, based on the weight of the polymer particles,
    a) from 90 to 98 weight percent of structural units of the nonionic monoethylenically unsaturated monomer;
    b) from 0.2 to 2 weight percent of structural units of 2-(methacryloyloxy)ethyl phosphonic acid or a salt thereof; and
    c) from 0.2 to 3 weight percent of structural units of a sulfur acid monomer or a salt thereof.

11. A composition comprising a stable aqueous dispersion of polymer particles comprising, based on the weight of the polymer particles,
    a) from 80 to 99.8 weight percent of structural units of a nonionic monoethylenically unsaturated monomer;
    b) from 0.1 to 10 weight percent of structural units of 2-(methacryloyloxy)ethyl phosphonic acid or a salt thereof, and
    c) from 0.1 to 10 weight percent of structural units of a sulfur acid monomer or a salt thereof or a carboxylic acid monomer or a salt thereof or a combination of a sulfur acid monomer and a carboxylic acid monomer or salts thereof.

12. The composition of claim 11 wherein the nonionic monoethylenically unsaturated monomer is an acrylic monomer, a styrene monomer, a combination of styrene and acrylic monomers, a vinyl ester monomer, or a combination of ethylene and vinyl ester monomers.

13. The composition of claim 11 wherein the nonionic monoethylenically unsaturated monomer is an acrylic monomer or a combination of acrylic and styrene monomers.

14. The composition of claim 13 wherein the acrylic monomer is one or more monomers selected from the group consisting of methyl methacrylate, ethyl acrylate, butyl acrylate, 2-propylheptyl acrylate, 2-ethylhexyl acrylate, and ureido methacrylate; and the styrene monomer is styrene.

15. The composition of claim 14 wherein the polymer particles comprise from 0.5 to 3 weight percent of structural units of 2-(methacryloyloxy)ethyl phosphonic acid or a salt thereof, based on the weight of the polymer particles.

16. The composition of claim 15 which comprises, based on the weight of the polymer particles, from 90 to 98 weight percent of structural units of the acrylic monomer or a combination of the acrylic monomer and the styrene monomer; and from 0.5 to 5 weight percent of structural units of a salt of a sulfur acid monomer wherein the salt of the sulfur acid monomer is sodium 4-vinylbenzenesulfonate.

* * * * *